United States Patent
Narayanan et al.

(10) Patent No.: US 9,811,874 B2
(45) Date of Patent: Nov. 7, 2017

(54) FRAME TIMES BY DYNAMICALLY ADJUSTING FRAME BUFFER RESOLUTION

(71) Applicant: NVIDIA Corporation, Santa Clara, CA (US)

(72) Inventors: Swaminathan Narayanan, San Jose, CA (US); Nicholas Haemel, San Francisco, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 281 days.

(21) Appl. No.: 13/731,963

(22) Filed: Dec. 31, 2012

(65) Prior Publication Data
US 2014/0184626 A1 Jul. 3, 2014

(51) Int. Cl.
*G06T 1/60* (2006.01)
*G09G 3/00* (2006.01)
*G09G 5/391* (2006.01)
*G09G 5/14* (2006.01)
*G09G 5/399* (2006.01)

(52) U.S. Cl.
CPC .............. *G06T 1/60* (2013.01); *G09G 3/003* (2013.01); *G09G 5/391* (2013.01); *G09G 5/14* (2013.01); *G09G 5/399* (2013.01); *G09G 2340/0407* (2013.01); *G09G 2340/0435* (2013.01); *G09G 2360/02* (2013.01); *G09G 2360/08* (2013.01)

(58) Field of Classification Search
CPC .............................. G06T 2210/36; G06T 3/40
See application file for complete search history.

(56) References Cited

U.S. PATENT DOCUMENTS

| | | |
|---|---|---|
| 5,142,690 A | 8/1992 | McMullan, Jr. et al. |
| 5,386,552 A | 1/1995 | Gamey |
| 5,388,265 A | 2/1995 | Volk |
| 5,396,635 A | 3/1995 | Fung |
| 5,402,492 A | 3/1995 | Goodman et al. |
| 5,446,904 A | 8/1995 | Belt et al. |
| 5,524,249 A | 6/1996 | Suboh |

(Continued)

FOREIGN PATENT DOCUMENTS

| | | |
|---|---|---|
| GB | 2547170 | 8/2009 |
| WO | 20040102623 | 11/2004 |

OTHER PUBLICATIONS

IEEE Journal of Solid-State Circuits, vol. 42, No. 1, Jan. 2007, pp. 1-10.

*Primary Examiner* — Barry Drennan
*Assistant Examiner* — Jason Pringle-Parker (57) ABSTRACT

System and method of dynamically adjusting a frame buffer resolution. An average frame rate is dynamically computed based on the frame rates with respect to rendering a sequence of previous frames to a frame buffer. The frame rates may vary with the processing load of an associated graphics processor. A target scaling factor for frame buffer resolution is computed based upon the dynamic average frame rate and a desired frame rate. The current scaling factor of frame buffer resolution for rendering a respective frame data of a sequence of frame data to the frame buffer is adjusted incrementally to reach the target scaling factor. Accordingly, frame resolutions for rendering the sequence of frame data to the frame buffer are incrementally adjusted based on corresponding current scaling factors.

20 Claims, 5 Drawing Sheets

(56) References Cited

U.S. PATENT DOCUMENTS

| | | |
|---|---|---|
| 5,557,777 A | 9/1996 | Culbert |
| 5,752,050 A | 5/1998 | Hernandez et al. |
| 5,790,877 A | 8/1998 | Nishiyama et al. |
| 5,889,529 A * | 3/1999 | Jones et al. .................... 345/660 |
| 5,898,879 A | 4/1999 | Kim |
| 5,951,689 A | 9/1999 | Evoy et al. |
| 6,178,523 B1 | 1/2001 | Klein |
| 6,266,776 B1 | 7/2001 | Sakai |
| 6,272,649 B1 | 8/2001 | Hayward et al. |
| 6,275,919 B1 | 8/2001 | Johnson |
| 6,347,370 B1 | 2/2002 | Grimsrud |
| 6,523,128 B1 | 2/2003 | Stapleton et al. |
| 6,542,240 B2 | 4/2003 | Lagace |
| 6,549,240 B1 * | 4/2003 | Reitmeier ..................... 348/459 |
| 6,694,451 B2 | 2/2004 | Atkinson |
| 6,760,850 B1 | 7/2004 | Atkinson et al. |
| 6,804,763 B1 | 10/2004 | Stockdale et al. |
| 6,845,434 B2 | 1/2005 | Lin |
| 6,901,298 B1 | 5/2005 | Govindaraj et al. |
| 6,990,594 B2 | 1/2006 | Kim |
| 7,015,909 B1 | 3/2006 | Morgan, III et al. |
| 7,043,649 B2 | 5/2006 | Terrell, II |
| 7,058,834 B2 | 6/2006 | Woods et al. |
| 7,100,013 B1 | 8/2006 | de Waal |
| 7,174,472 B2 | 2/2007 | Hill |
| 7,401,240 B2 | 7/2008 | Heller, Jr. et al. |
| 7,414,550 B1 | 8/2008 | Sudharsanan |
| 7,426,647 B2 | 9/2008 | Fleck et al. |
| 7,428,644 B2 | 9/2008 | Jeddeloh et al. |
| 7,434,072 B2 | 10/2008 | Peirson et al. |
| 7,529,958 B2 | 5/2009 | Roth et al. |
| 7,590,815 B1 | 9/2009 | de Waal |
| 7,624,215 B2 | 11/2009 | Axford et al. |
| 7,739,533 B2 | 6/2010 | Rauschmayer et al. |
| 7,839,410 B1 | 11/2010 | Brown et al. |
| 8,327,173 B2 | 12/2012 | Hendin et al. |
| 9,209,792 B1 | 12/2015 | Browning |
| 9,411,390 B2 | 8/2016 | Smith et al. |
| 9,423,846 B2 | 8/2016 | Smith et al. |
| 9,547,602 B2 | 1/2017 | Klaiber et al. |
| 2002/0126751 A1 * | 9/2002 | Scheurich et al. ....... 375/240.02 |
| 2003/0004921 A1 | 1/2003 | Schroeder |
| 2003/0156639 A1 * | 8/2003 | Liang ..................... 375/240.01 |
| 2003/0204757 A1 | 10/2003 | Flynn |
| 2005/0021656 A1 * | 1/2005 | Callegari ..................... 709/213 |
| 2005/0057551 A1 * | 3/2005 | Gong et al. .................. 345/211 |
| 2005/0271361 A1 * | 12/2005 | Aoki et al. ..................... 386/68 |
| 2006/0184808 A1 | 8/2006 | Chua-Eoan et al. |
| 2006/0226895 A1 | 10/2006 | Hoshi et al. |
| 2007/0206018 A1 | 9/2007 | Bajic et al. |
| 2009/0204830 A1 | 8/2009 | Frid et al. |
| 2012/0054519 A1 | 3/2012 | Branover et al. |
| 2012/0105452 A1 * | 5/2012 | Diard ............................ 345/428 |
| 2012/0110351 A1 | 5/2012 | Raju et al. |
| 2012/0188233 A1 * | 7/2012 | Shuster et al. ................ 345/419 |
| 2012/0223940 A1 * | 9/2012 | Dunstan et al. .............. 345/419 |
| 2012/0306877 A1 | 12/2012 | Rosasco |
| 2013/0002838 A1 * | 1/2013 | Takenaka ........................ 348/56 |
| 2013/0097443 A1 | 4/2013 | Li et al. |

\* cited by examiner

FRAME TIMES BY DYNAMICALLY ADJUSTING FRAME BUFFER RESOLUTION

CROSS-REFERENCES TO RELATED APPLICATIONS

This application claims the benefit of Provisional Application No. 61/585,620, filed on Jan. 11, 2012, titled "GRAPHICS PROCESSOR CLOCK SCALING, APPLICATION LOAD TIME IMPROVEMENTS, AND DYNAMICALLY ADJUSTING RESOLUTION OF RENDER BUFFER TO IMPROVE AND STABILIZE FRAME TIMES OF A GRAPHICS PROCESSOR," by Swaminathan Narayanan, et al., which is herein incorporated by reference.

TECHNICAL FIELD

The present disclosure relates generally to the field of graphics processing and more specifically to the field of dynamically adjustable render buffer resolutions to improve frame times.

BACKGROUND

It is desirable to have a consistent and responsive framerate for software applications, especially graphics intensive applications, such as video games and applications utilizing 3D graphics. This is particularly important in real-time 3D video games and applications. 3D graphics software that is designed to run on high-end graphics processing (GPU) hardware (requiring intensive graphics processing from the GPU hardware) will often run poorly on low-end GPU hardware, resulting in an undesirable frame-rate slowdown. This frame-rate slowdown will be exacerbated when the GPU hardware needs to deliver stereoscopic display data with left and right display images for stereoscopic 3D viewing. Such applications will run roughly twice as slow in a stereoscopic mode because the amount of work the GPU hardware has to perform is doubled. Such reduced frame rates may lead to imagery that appears to be jerky and visually unappealing.

Attempts to overcome these limitations include presenting users with a selected number of predefined resolutions that a particular GPU is able to render to. These selectable resolutions usually follow standard display resolutions and do not have the necessary range and granularity needed to run on a variety of GPUs. A user would need to guess at an optimal resolution given a particular game/application and device capabilities. In addition, the optimal resolution may change from frame to frame, depending on what is being rendered by the GPU. Lastly, selecting a different one of the selectable standard display resolutions requires a user to pause a currently running application to make the selection.

SUMMARY OF THE INVENTION

Embodiments of this present invention provide solutions to the challenges inherent in maintaining an optimal frame rate by dynamically adjusting frame buffer resolutions. As discussed herein, resolution scaling is performed from frame to frame. An average frame rate is calculated by using a configurable sliding window of the frames rendered thus far. A scaling factor is estimated such that the desired frame rate can be achieved by reducing the amount of work that the graphics processor has to perform. A resolution of a frame of data rendered to the frame buffer is adjusted by adjusting viewport and scissor extents according to the current scaling factor. As discussed herein, the frame buffer resolution may be adjusted downward with a downscaling factor or adjusted upward with an upscaling factor. Whether adjusted upwards or downwards, the buffer resolution may be similarly adjusted with the scaling factor.

In a method according to one embodiment of the present invention, a method for dynamically adjusting a frame buffer resolution is disclosed. The method comprises calculating a target scaling factor and incrementally changing a current scaling factor to reach the target scaling factor. The method includes calculating an average frame rate, and based upon the average frame rate and the current scaling factor, calculating the target scaling factor. The resolution of a frame of data rendered to the frame buffer is adjusted according to the current scaling factor.

In a computer system according to one embodiment of the present invention, the computer system comprises a processor, a graphics processor, and a memory. The memory is operable to store instructions, that when executed by the processor perform a method for adjusting a frame resolution. The method comprises calculating a target scaling factor and incrementally changing a current scaling factor to reach the target scaling factor. The method includes calculating an average frame rate, and based upon the average frame rate and a current scaling factor, calculating the target scaling factor. The resolution of a frame of data rendered to the frame buffer is adjusted according to the current scaling factor.

In a graphics rendering system according to one embodiment of the present invention, the graphics rendering system comprises a processor and a frame buffer. The processor is operable to dynamically adjust a resolution of the frame buffer by incrementally changing a current scaling factor to reach a target scaling factor. The processor is further operable to determine the target scaling factor based upon an average frame rate and the current scaling factor. The processor is further yet operable to adjust the resolution of a frame of data rendered to the frame buffer according to the current scaling factor.

BRIEF DESCRIPTION OF THE DRAWINGS

Embodiments of the present invention will be better understood from the following detailed description, taken in conjunction with the accompanying drawing figures in which like reference characters designate like elements and in which.

DETAILED DESCRIPTION

Reference will now be made in detail to the preferred embodiments of the present invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of embodiments of the present invention, numerous specific details are set forth in order to provide a thorough understanding of the present invention. However, it will be recognized by one of ordinary skill in the art that the present invention may be practiced without these specific details. In other instances, well-known methods, procedures, components, and circuits have not been described in detail so as not to unnecessarily obscure aspects of the embodiments of the present invention. The drawings showing embodiments of the invention are semi-diagrammatic and not to scale and, particularly, some of the dimensions are for the clarity of presentation and are shown exaggerated in the drawing Figures. Similarly, although the views in the drawings for the ease of description generally show similar orientations, this depiction in the Figures is arbitrary for the most part. Generally, the invention can be operated in any orientation.

Notation and Nomenclature

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "executing" or "storing" or "rendering" or "calculating" or "reducing" or "increasing" the like, refer to the action and processes of a computer system, or similar electronic computing device, that manipulates and transforms data represented as physical (electronic) quantities within the computer system's registers and memories and other computer readable media into other data similarly represented as physical quantities within the computer system memories or registers or other such information storage, transmission or display devices. When a component appears in several embodiments, the use of the same reference numeral signifies that the component is the same component as illustrated in the original embodiment.

Embodiments of this present invention provide solutions to the increasing challenges inherent in maintaining an optimal frame rate by dynamically adjusting frame buffer resolutions transparently to executing applications. Resolution scaling may be performed from frame to frame. An average frame-rate may be calculated using a configurable sliding window that selects a plurality of previously rendered frames for averaging. A scaling factor is estimated such that a desired frame-rate can be achieved by reducing an amount of work that a graphics processor has to perform. As discussed herein, the downscaled resolution of the frame buffer will be based on the scaling factor. As also discussed herein, a scaling factor may be either a downscaling factor for a reduced resolution or an upscaling factor for an increased resolution.

Improving Frame Times by Dynamically Adjusting Frame Buffer Resolution

Figure 1:
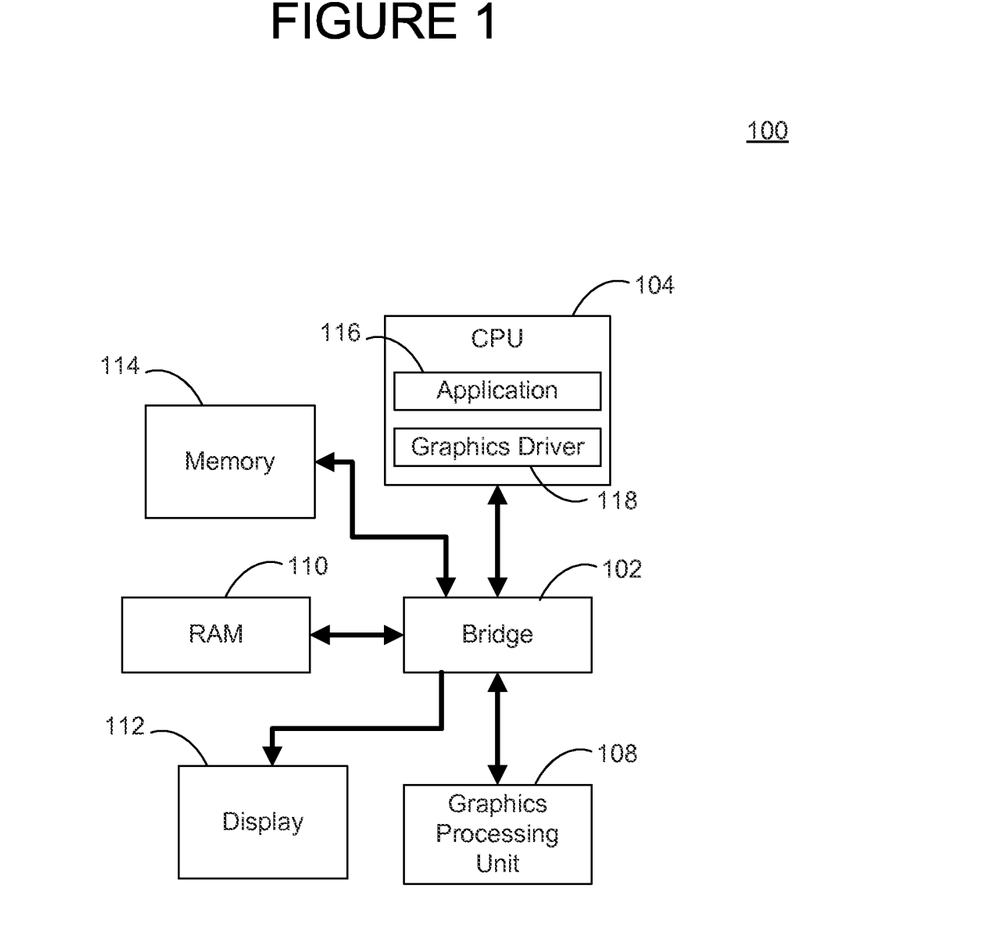
FIG. 1 illustrates a schematic block diagram of a graphics rendering system in accordance with an embodiment of the present invention.

FIG. 1 illustrates a computer system with an exemplary graphics rendering system, comprising a central processor (CPU) 104 interconnected through a bridge 102 to: a memory 114, a random access memory (RAM) 110, and a graphics processor (GPU) 108. An exemplary GPU 108 is operable to render graphics for display on a display device 112. An exemplary memory 114 may comprise a hard disk drive or some other memory storage device used to store applications and data to be executed by the CPU 104. In one exemplary embodiment, the bridge 102 comprises an interface for communicating display information from the GPU 108 to the display device 112. In one embodiment, the interface comprises an embedded DisplayPort (eDP) interface, a low-voltage differential signaling (LVDS) interface, or a high-definition multimedia interface (HDMI). In one embodiment, the display device 112 may comprise a high-definition monitor, a liquid crystal display (LCD) monitor, a light emitting diode (LED) monitor, or a cathode ray tube (CRT) monitor. Other monitor types and configurations are also possible and are within the scope of this disclosure. In one exemplary embodiment, a graphics rendering system is a stereoscopic rendering system with twice the rendering requirements of non-stereoscopic rendering systems.

In one exemplary embodiment, the GPU 108, following instructions from the CPU 104, processes frames of display data that are subsequently sent to the display device 112. In one embodiment, the CPU 104 executes an application 116 that is in communication with a graphics driver 118 operable to direct the GPU 108 by executing graphics instruction sets.

Figure 2:
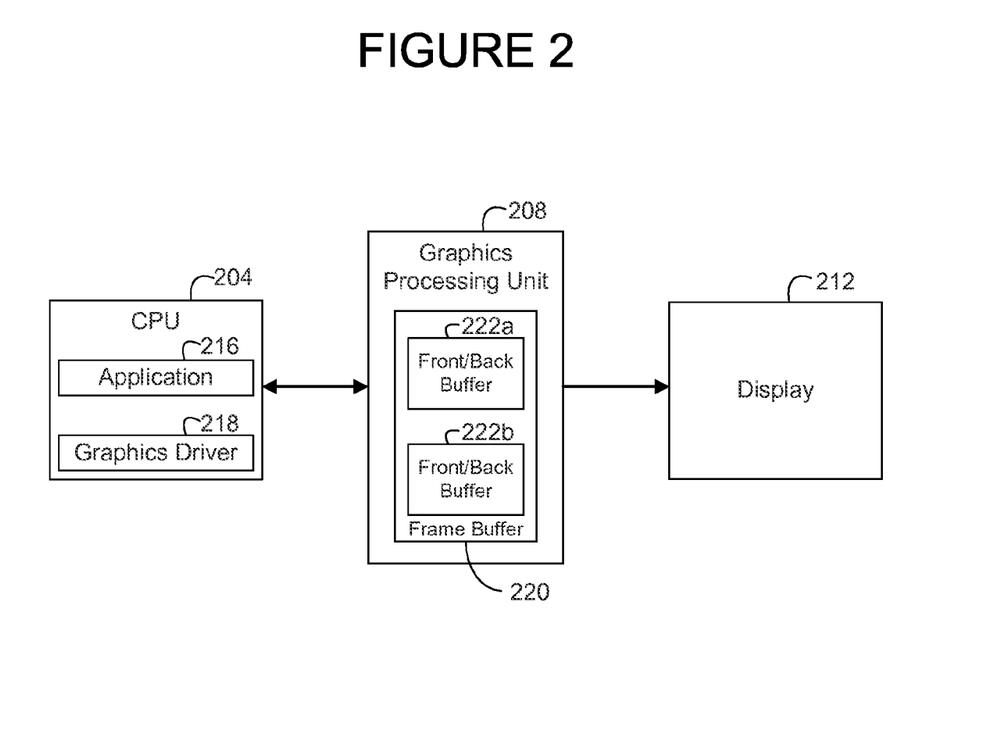
FIG. 2 illustrates a schematic block diagram of a graphics rendering system with dynamically adjustable render buffer resolution in accordance with an embodiment of the present invention.

FIG. 2 illustrates an exemplary graphics rendering system 200 comprising a central processing unit (CPU) 204, a graphics processor (GPU) 208, and a display device 212. As illustrated in FIG. 2, the CPU 204 executes an application 216 that is in communication with a graphics driver 218 operable to direct the GPU 208 by executing graphics instruction sets. In one exemplary embodiment, the GPU 208 comprises a frame buffer 220 that comprises front/back buffer 222a and front/back buffer 222b.

As illustrated in FIG. 2A, while the display 112 is being refreshed with a current frame of display data, the next frame of data to be displayed is also being processed by the GPU 108. For example, while the display 112 is being refreshed with frame 0, the GPU is also processing data for the next frame, frame 1. As also illustrated in FIG. 2A, before the GPU 108 begins processing the data for the next frame, the graphics driver in the CPU 104 will have completed its processing and directed the GPU 108 to proceed with processing the data. During a time period where the display is being refreshed with a frame of data (e.g., frame 0), the graphics driver in the CPU 104 communicates command(s) to the GPU 108 to process a next frame of data (e.g., frame 1) that will be used to refresh the display during a next time period. In other words, while the display 112 is refreshed with a current frame of data, a next frame of data is processed by the graphics driver 118 and the GPU 108.

Figure 3A:
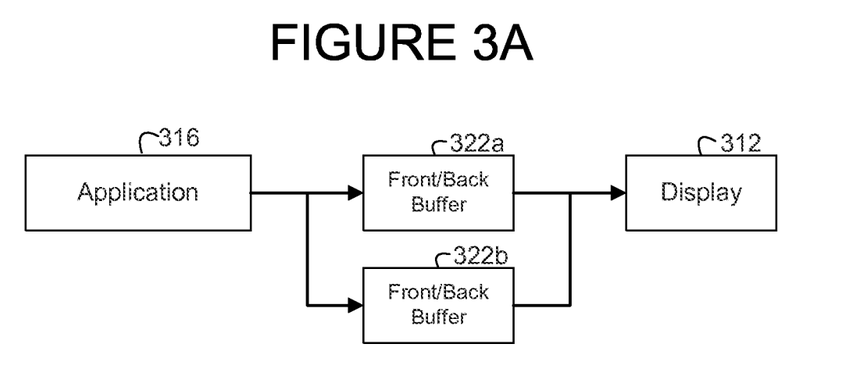
FIGS. 3A, 3B, and 3C illustrate schematic functional block diagrams for front and back buffers with dynamically adjustable render buffer resolution in accordance with an embodiment of the present invention.
Figure 3B:
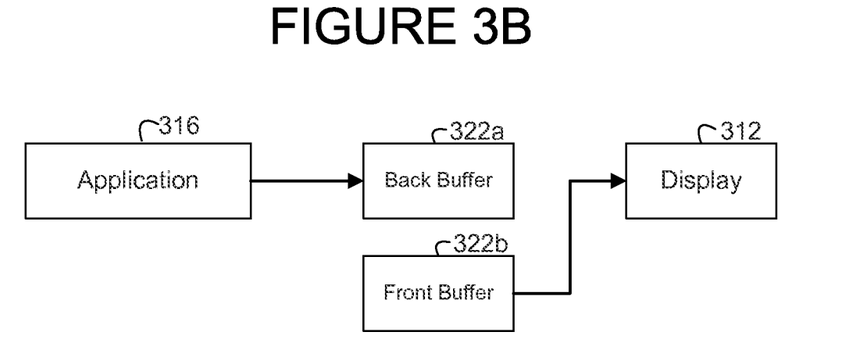
Figure 3C:
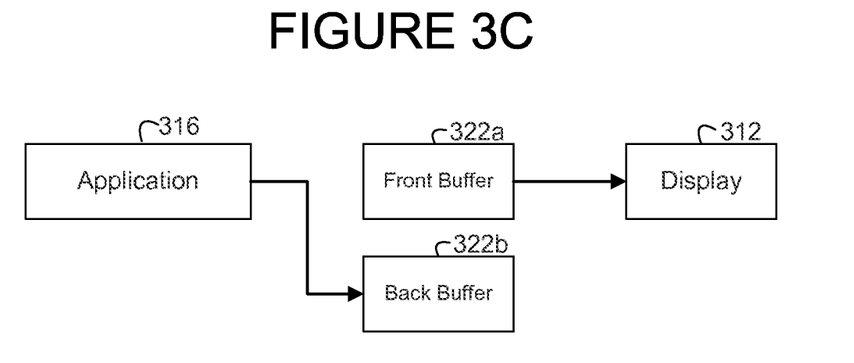

FIGS. 3A, 3B, and 3C illustrate exemplary functional block diagrams for front and back buffers with dynamically adjustable render buffer resolutions. As illustrated in FIG. 3A, an application 316 directs a frame of display data to be rendered to either front/back buffer 322a or front/back buffer 322b that is subsequently displayed on a display device 312. As discussed herein, while a frame of display data is rendered to one of the front/back buffers 322a, 322b, a previously rendered frame of display data in the opposite front/back buffer 322a, 322b is displayed on the display device 312. As illustrated in FIGS. 3B and 3C, in one embodiment, a front/back buffer 322a, 322b rendering a frame of display data is a back buffer, while a front/back buffer 322a, 322b containing a rendered frame of display data for display on the display device 312 is a front buffer.

As illustrated in FIG. 3B, while a frame of display data is rendered to buffer 322a (back buffer), a previously rendered frame of display data in the buffer 322b (front buffer) is displayed on the display device 312. As illustrated in FIG. 3C, while a frame of display data is rendered to buffer 322b (back buffer), a previously rendered frame of display data in buffer 322a (front buffer) is displayed on the display device 312. As illustrated in FIGS. 3B and 3C, the processes of rendering and displaying frames of display data alternate between buffer 322a and buffer 322b. In one embodiment, the buffer 322a, 322b currently being rendered to (the back buffer) may also be referred to as a primary buffer, while the opposite buffer 322a, 322b holding a previously rendered frame of display data to be displayed by the display device 312 (the front buffer) may also be referred to as a secondary buffer.

Figure 4:
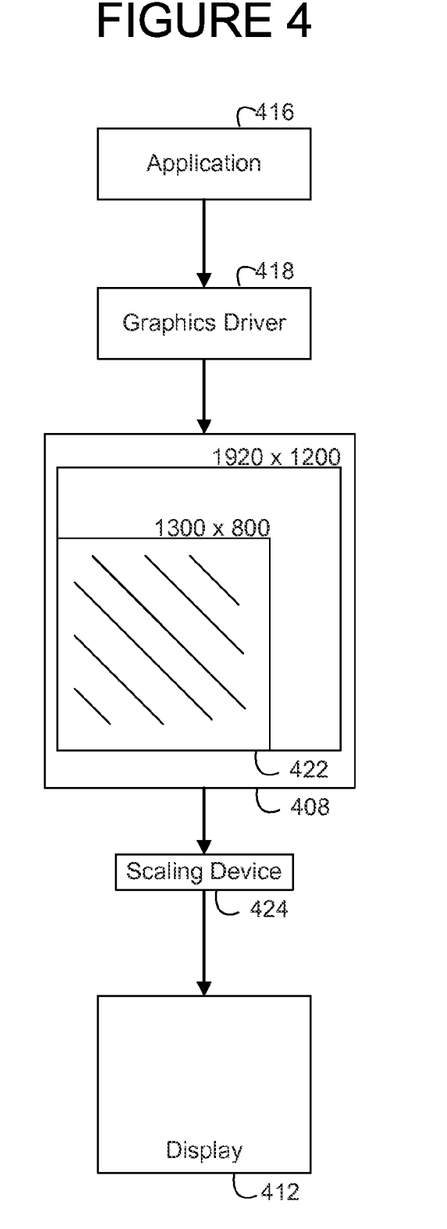
FIG. 4 illustrates a schematic block diagram of a dynamically adjustable render buffer in accordance with an embodiment of the present invention.

FIG. 4 illustrates an exemplary schematic block diagram of a dynamically adjustable render buffer. As illustrated in FIG. 4, an application 416, through a graphics driver 418, directs a frame of display data to be rendered to a render buffer 422 of a GPU 408. As illustrated in FIGS. 3A-3C, the render buffer 422 may be a back buffer. After rendering, the frame of display data in the render buffer 422 will be displayed by the display device 412 after any necessary scaling is performed by the scaling device 424. In one exemplary embodiment, the scaling device 424 is operable to scale the frame of display data to a display resolution for the display device 412. In one exemplary embodiment, a stereoscopic rendering system comprises a pair of render buffers 422.

As also illustrated in FIG. 4, a resolution of a frame of display data rendered to the render buffer 422 may be dynamically adjusted frame by frame. In a stereoscopic rendering system, the pair of render buffers 422 will be similarly adjusted. As discussed herein, a render buffer resolution may be adjusted by any fraction of the allocated resolution. In one exemplary embodiment, the resolution may be dynamically adjusted from a resolution of 1920× 1200 to a lower resolution (e.g., 1300×800) when the allocated resolution (1920×1200) as desired by the application 416 results in an undesirable frame-rate. As discussed herein, the render buffer 422 resolution may be incrementally adjusted from a current resolution to a downscaled target resolution. For scenes with heavy detail and complex geometry, the render buffer resolution may be dynamically scaled down to maintain desired frame-rates, while conversely, the render buffer resolution may be dynamically increased when the processing load on the GPU 408 has been reduced. In one exemplary embodiment, a render buffer resolution may be adjusted to a resolution greater than the target resolution (a fraction greater than 1). Such resolution adjustments may achieve better quality through Super Sampling (rendering to a larger resolution and then downscaling the final result).

In one embodiment, the dynamically adjusted resolution of the render buffer 422 is transparent to the application 416. While the application 416 may request or select a render buffer resolution of 1920×1200, a reduced or downscaled resolution may be selected by the graphics driver 418. In other words, while the application 416 requests/selects a render buffer resolution of 1920×1200, the application 416 is unaware that frames of display data are actually being rendered at a different resolution.

As discussed herein, efficient, dynamic render buffer resolution adjustments cannot be performed by an application 416 without undesirable artifacts. For example, an exemplary application 416 may direct rendering to a frame buffer object (e.g., a render target) that is dynamically resized based on a desired frame rate, however, such adjustments are inefficient because the application 416 has to perform an additional 3D blit from the downscaled result to the display surface (render buffer 422). As discussed herein, there may also be complications involved in performing this additional 3D blit to avoid artifacts at the edges of the downscaled surface prior to the texture filtering. For example, should the application 416 request direct rendering to just a portion of the render buffer 422, the graphics driver 418 and GPU 408 will not know that only a portion of the render buffer resolution is being used and display data values outside the selected portion of the render buffer 422 may be introduced into texturing/filtering and other graphics processing operations. Filtering should be performed such that the graphics driver 416 and the GPU 408 know what the rendered portion is. In other words, the application 416 cannot perform the desired dynamic resolution downscaling without introducing artifacts because the graphics driver 418 wouldn't be able to know what changes to the rendered surface (render buffer 422) have been made by the application 416.

In one exemplary embodiment, the graphics driver 418 dynamically adjusts a normalized coordinate system used by the GPU 408 for texturing/filtering, etc. In exemplary embodiments, if an allocated render buffer size of 1920× 1200 is referenced with a 0.0 to 1.0 coordinate system, reducing the render buffer resolution to 70% of the allocated resolution does not result in a coordinate value range of 0.0 to 0.7 (which would result in artifacts during texturing/ filtering, etc.). Instead, as discussed in detail below, the coordinate system remains 0.0 to 1.0 by adjusting the resolution of the render buffer 422 with the graphics driver 418.

In one embodiment, the application 416 may set an initial window size and a render buffer size, which are stored away for future use should the application 416 make a call-back request (e.g., a read back of pixels) that would require the original render buffer size, etc. These may be equal, or of different resolutions. As discussed herein, a scaling factor is used to perform the downscaling of the display surface (render buffer 422). In one embodiment, scaling factors are used by the graphics driver 418 to adjust viewport and scissor extents to change the render buffer resolution, in spite of the allocated resolution. In one embodiment, scan out from the render buffer 422 uses a crop window that is set to the scaled resolution. As discussed herein, the scaling device 424 performs any up scaling from a downscaled resolution (or downscaling from an upscaled resolution) to the display resolution used by the display device 412. The render buffer resolution does not need to be reallocated or resized when the scaling factor changes because by adjusting the viewport and scissor extents with the changing scaling factor, the graphics driver 418 instructs the GPU 408 to render to a specified render buffer resolution, even when the render buffer 422 is allocated to a different resolution. Therefore, there are no additional steps to compress or extend a render buffer resolution because such required scaling is already performed to deal with render buffer and window sizes, as adjusted by the viewport and scissor extents.

In one embodiment, a render buffer resolution may be incrementally adjusted by the viewport and scissor extents using an incremented downscale factor. For example, with a current downscale factor of 0.9, an allocated render buffer resolution will be adjusted by the viewport and scissor extents to a resolution of 90% of the allocated resolution. It is desirable to adjust the current downscaling factor to a target downscaling factor such that a target frame-rate may be reached as soon as possible. However, at the same time, it is also necessary to adjust the current downscaling factor gradually so that a user does not find the resolution change distracting. In other words, the render buffer 422 will not be adjusted by the full target downscaling factor in a single frame of display data, but will be incrementally spread over a plurality of frames. While the preceding example included an incremented downscaling factor, an upscaling factor may also be incremented in the same manner.

In one embodiment, a current scaling factor is incrementally changed to reach the target scaling factor to minimize visual artifacts due to changing resolutions. The increment is computed such that it results in a change in resolution of at least a pixel. In one exemplary embodiment, a current downscaling factor may be changing from 1.0 to 0.9 for an original resolution width of 1280. In one embodiment, the resolution change from 1280 to 1152 (using a target downscaling factor of 0.9) will take 64 frames if the resolution is changed by two pixels per rendered frame. Other embodiments may result in faster or slower resolution changes.

In one embodiment, an application 416 may also render to off-screen buffers to produce desired effect(s). If the application 416 selects a render buffer size of 1920×1200, then any off-screen buffers may also be at the 1920×1200 resolution. When the render buffer 422 is adjusted by the graphics driver 418, any off-screen buffers may be similarly adjusted to mirror the render buffer resolution adjustment.

The target downscaling factor may also be used to scale down any frame buffer objects (FBO) that are used by the application. When an FBO is used as a texture, the graphics driver 418 may also program the texture registers to the current downscaled resolution. By adjusting the texture width/height at the graphics driver 418, problems associated with handling filtering artifacts that occur at texture edges may be bypassed. Note that FBOs do not need to be reallocated or resized when the downscaling factor changes.

In one embodiment, when exemplary applications use frame buffer objects, most of the graphics rendering work may be done using the FBOs. User interface (UI) elements may also be rendered directly to the render buffer (e.g., the back buffer). By using separate downscaling factors for the display surface and the frame buffer objects, the UI elements may be rendered in higher resolution. In cases where a graphics API allows the read back of pixels, an additional blit may be performed from the downscaled buffer to a new buffer at the original, allocated resolution. Thus the penalty of the blit is incurred only in cases when the application requests read back of the pixels.

Therefore, in one embodiment, an application 416 doesn't have to take into consideration how well the application 416 will perform for a particular hardware combination/configuration. Resolution adjustments may be made that are entirely transparent to the application 416. It can be difficult for an application 416 to know how well the application 416 will perform for a given hardware arrangement. Embodiments of the present invention allow the render buffer resolution to be adjusted dynamically without pausing a video game or application to adjust the resolution.

Figure 5:
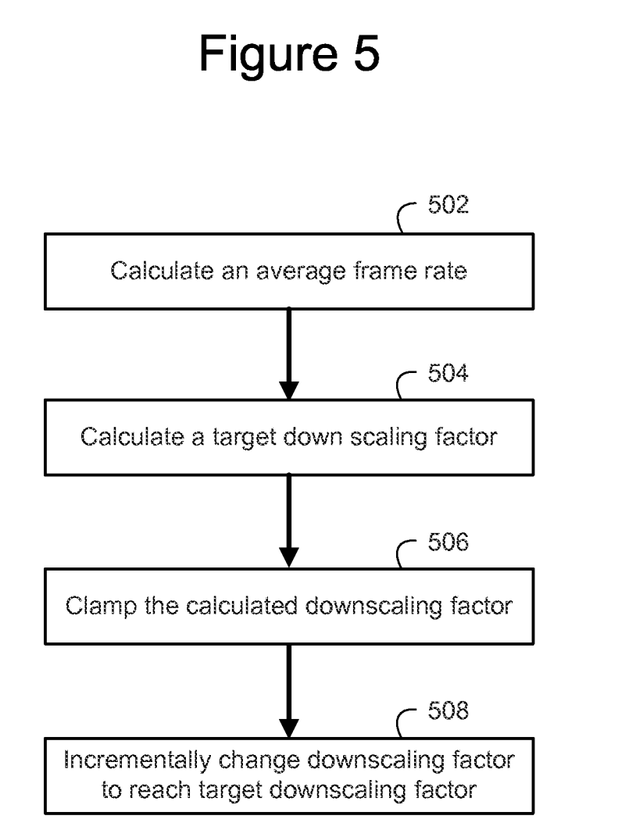
FIG. 5 illustrates an exemplary flow diagram, illustrating a process for dynamically adjusting render buffer resolution in accordance with an embodiment of the present invention.

FIG. 5 illustrates exemplary steps to a process for dynamically adjusting a resolution of a render buffer 422. In step 502 of FIG. 5, an average frame rate is calculated using a sliding window of previous frame times. An adjustable quantity of previous frame times are used to form the sliding window. In step 504 of FIG. 5, using the average frame rate calculated in step 502, and a current scaling factor, a target scaling factor is calculated. As discussed herein, the viewport and scissor extents, using the current scaling factor, dynamically adjust the render buffer resolution.

In step 506 of FIG. 5, the calculated scaling factor, calculated in step 504 is clamped using a specified lower bound on the calculated scaling factor. In step 508 of FIG. 5, a current scaling factor is incrementally changed to reach the target scaling factor to minimize visual artifacts due to changing resolutions. The increment is computed such that it results in a change in resolution of at least a pixel. In one exemplary embodiment, a current scaling factor may be changing from 1.0 to 0.9 for an original resolution width of 1280. In one embodiment, the resolution change from 1280 to 1152 (using a target downscaling factor of 0.9) will take 64 frames if the resolution is changed by two pixels per rendered frame. As discussed herein, a current scaling factor may also be changed to a target scaling factor that is larger than the current scaling factor (e.g., changing the scaling factor from 0.9 to 1.0).

Although certain preferred embodiments and methods have been disclosed herein, it will be apparent from the foregoing disclosure to those skilled in the art that variations and modifications of such embodiments and methods may be made without departing from the spirit and scope of the invention. It is intended that the invention shall be limited only to the extent required by the appended claims and the rules and principles of applicable law.

What is claimed is:

1. A computer implemented method of dynamically adjusting a frame buffer resolution, the method comprising:
    calculating an average frame rate for rendering a plurality of previous frames
    calculating a target scaling factor related to frame buffer resolution based upon the average frame rate;
    based on the target scaling factor, determining plurality of current scaling factors for rendering a sequence of frames to a frame buffer, wherein the sequence of frames are to be rendered subsequent to the plurality of previous frames, wherein each current sc lin. factor corresponds to a frame of the sequence of frames, and wherein the plurality of current scaling factors vary incrementally to reach the target scaling factor; and
    adjusting a resolution of a respective frame of the sequence of frames rendered to the frame buffer according to a corresponding current scaling factor.

2. The computer implemented method of claim 1, wherein the adjusting the resolution of the respective frame of data rendered to the frame buffer comprises adjusting viewport and scissor extents according to the corresponding current scaling factor.

3. The computer implemented method of claim 1, wherein an adjusted frame buffer resolution is transparent to an application program directing an original resolution.

4. The computer implemented method of claim 1, wherein the target scaling factor is calculated based upon the average frame rate and a target frame rate, and wherein further variation in frame rate among rendering the plurality of previous frames is resulted from a processing load variation of the graphics processor with respect to the plurality of previous frames.

5. The computer implemented method of claim 1, wherein the target scaling factor is periodically calculated.

6. The computer implemented method of claim 1, wherein determining the plurality of current scaling factors comprises changing a current scaling factor by at least 1 pixel each frame until the target scaling factor is reached.

7. The computer implemented method of claim 1 further comprising:
calculating a target scaling factor for a frame buffer object (FBO) that is different from the target scaling factor for the frame buffer resolution, wherein the FBO is rendered to an off screen buffer.

8. A computer system comprising:
a processor;
a graphics processor; and
a memory, wherein the memory is operable to store instructions, that when executed by the processor perform a method for dynamically adjusting a frame buffer resolution, the method comprising:
calculating an average frame rate or rendering a plurality of previous frames to a frame buffer;
calculating a target scaling factor for frame buffer resolution based upon the average frame rate;
determining a plurality of current scaling factors of a sequence of frames to be rendered subsequent to the plurality of previous frames, wherein each current scaling factor corresponding to a frame of the sequence of frames and wherein the plurality of current scaling incrementally to reach the target scaling factor, and
adjusting a resolution of a frame of data rendered to the frame buffer according to a corresponding current scaling factor.

9. The computer system of claim 8, wherein the adjusting the resolution of the frame of data rendered to the frame buffer comprises adjusting viewport and scissor extents according to the current scaling factor.

10. The computer system of claim 8, wherein an adjusted frame buffer resolution is transparent to an application program directing an original resolution.

11. The computer system of claim 8, wherein the target scaling factor is calculated based upon the average frame rate and a target frame rate, and wherein further variation among the frame rates is resulted from a processing load variation of the graphics processor with respect to the plurality of previous frames.

12. The computer system of claim 8, wherein the target scaling factor is periodically calculated.

13. The computer system of claim 8, wherein the determining the plurality of current scaling factors comprises changing a current scaling factor by at least 1 pixel each frame until the target scaling factor is reached.

14. The computer system of claim 8, wherein the method further comprises calculating a target scaling factor for a frame buffer object (FBO) that is different from the target scaling factor for the frame buffer resolution, wherein the FBO is rendered to an off screen buffer.

15. A graphics rendering system comprising:
a processor; and
a frame buffer, wherein the processor is operable to dynamically adjust a resolution of the frame buffer by incrementally changing a current scaling factor that corresponds to a respective frame of a plurality of frames to reach a target scaling factor, wherein the processor is further operable to calculate the target scaling factor based upon an average frame rate for rendering a plurality of previous frames to a frame buffer and the current scaling factor, and wherein the processor is further operable to adjust a resolution of the respective frame of data rendered to the frame buffer according to the current scaling factor.

16. The graphics rendering system of claim 15, wherein the processor is further operable to adjust the resolution of the respective frame of data rendered to the frame buffer by adjusting viewport and scissor extents according to the current scaling factor.

17. The graphics rendering system of claim 15, wherein an adjusted frame buffer resolution is transparent to an application directing an original resolution.

18. The graphics rendering system of claim 15, wherein the target scaling factor is periodically calculated.

19. The graphics rendering system of claim 15, wherein the processor is further operable to change the current scaling factor by at least 1 pixel each frame until the target scaling factor is reached.

20. The graphics rendering system of claim 15, wherein the processor is further operable to calculate a target scaling factor for a frame buffer object (FBO) that is different from the target scaling factor for the frame buffer resolution, wherein the FBO is rendered to an off-screen buffer.

* * * * *